Nov. 29, 1949     J. G. SPERLING     2,489,337
AERIAL REFLECTING SIGNAL TARGET
Filed Aug. 10, 1945
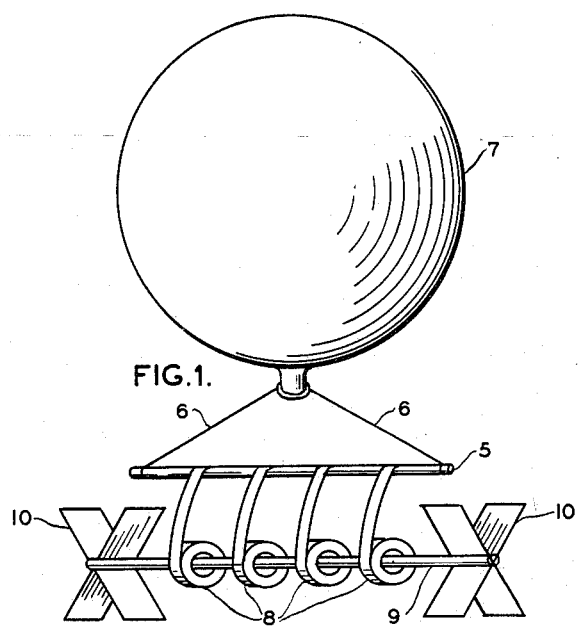
FIG.1.
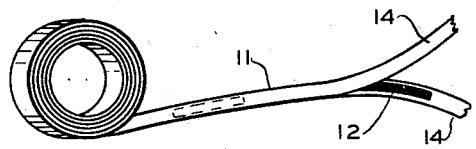
FIG.3.
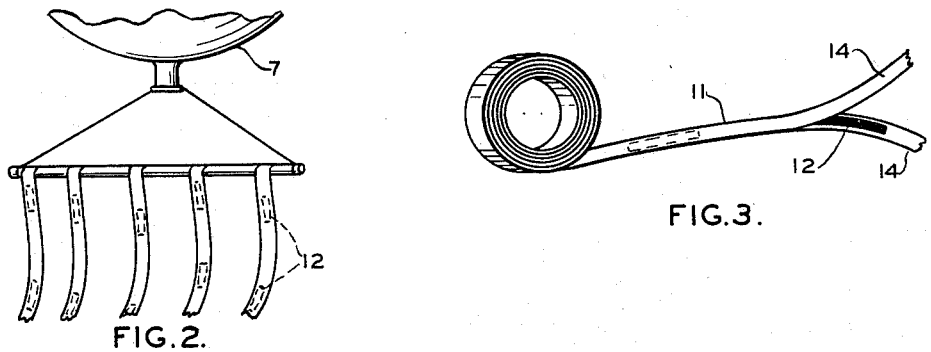
FIG.2.
FIG.4.
*INVENTOR.*
JACOB GEORGE SPERLING
BY *William D. Hall.*
*Attorney*

Patented Nov. 29, 1949

2,489,337

UNITED STATES PATENT OFFICE 2,489,337

AERIAL REFLECTING SIGNAL TARGET

Jacob George Sperling, Asbury Park, N. J., assignor to the United States of America as represented by the Secretary of War Application August 10, 1945, Serial No. 610,166

3 Claims. (Cl. 343—18)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to meteorological instruments, and more particularly to reflecting signal targets.

In recent years it has become the practice to obtain meteorological information pertaining to the atmosphere at high altitudes through the use of balloons, by means of which meteorological instruments are carried aloft to record temperature, pressure and humidity. In employing this technique it is also desirable to track the course of balloons in flight in order to obtain data on the velocity and direction of winds at various altitudes. To make such determinations of practical value it is necessary to follow the course of balloons to high altitudes and over appreciable distances.

Although balloons have been tracked in the past by optical means, with the development of radar systems it has become feasible to track balloons by the use of radio waves. Transmitted pulses of high frequency radio energy are directed at the balloon, and the returned echo signals reflected therefrom provide continuous information as to the course of the balloon through the atmosphere. This method makes it possible to track the balloon over great distances and under varying conditions of weather and visibility.

In order to enhance the intensity of the echo signals, resonant targets may be suspended from the balloon to effectively reflect radio signals from a distant transmitter to its associated receiver. In this connection many types of resonant targets have been proposed. Reflecting foil members may be distributed at random within the balloon structure and caused to adhere to the surface thereof. These "windows" or "chaff" provide a fairly effective reflecting surface. Other targets may consist of flat planes covered with sheets of foil, wire mesh, or other conducting material. This assembly may be suspended below the balloon by a cable or cord. While these corner reflectors provide excellent reflecting targets, their weight presents a disadvantage in using them with balloons where a high rate of ascent is desirable.

According to the present invention, conducting means of a foil-strip nature having such dimensions as to be resonant at a predetermined frequency are mounted in end-to-end fashion on elongated paper strips or streamers. The resonant foil strips are spaced along the paper streamers at definite, predetermined intervals, each foil strip forming a resonant metallic member at the radio frequency being radiated by the tracking means. By employing a plurality of these paper streamers which are readily borne aloft by suitable means, a high average echo response to transmitted pulses is obtained, whereby the course of the target may be followed accurately over great distances.

It is, therefore, an object of the present invention to provide an effective light weight signal target.

A further object of the present invention is to provide a new and improved signal target having a yielding and practically unbreakable structure.

A still further object of the present invention is to provide a new and improved signal target which may be easily fabricated from a limited number of inexpensive components.

These and other objects and advantages of the present invention will become apparent from a perusal of the following detailed description, taken in connection with the accompanying drawings in which Figure 1 is a view in elevation of a balloon ready for launching showing the rolls of streamers suspended below the balloon;

Figure 2 is a view in elevation of a balloon in flight carrying unfurled streamers;

Figure 3 illustrates the details of the streamer construction; and

Figure 4 is a detail of a modified form of streamer construction.

Referring now to Figure 1, supporting bar 5 is shown attached by means of cords 6 to a balloon 7, which may be inflated with hydrogen or other gas lighter-than-air. Affixed to supporting bar 5 and spaced therealong are the ends of paper streamers which are arranged in rolls 8 placed upon a shaft 9. Vanes 10 comprise fins of cardboard or other suitable material fitted into slots at the ends of shaft 9. Upon releasing the assembly it will ascend rapidly. The vanes 10 present a large surface to the air thus retarding the unrolling due to gravity of the streamers wound in rolls 8 until the assembly has gained an appreciable altitude. When rolls 8 are completely unrolled, the shaft 9 with its vanes 10 will be released and will drop to the ground. The ascending signal target then appears as in Figure 2 with the streamers presenting an array of resonant reflecting members 12 suspended below the balloon 7. This array reflects an appreciable portion of the radio frequency energy impinging thereon, and the echoes returned to the tracking means provide signals whereby the course of the balloon may be followed.

The streamer construction is shown in detail in Figure 3. Strips of conducting material, preferably metal foil, are glued or otherwise fastened between paper strips 14, the double layer of paper forming the streamer 11. The foil members 12 are a half wave length long at the radio frequency being utilized to track the target, and they are spaced regularly along the streamer 11. In one embodiment, where 10 centimeter radio waves were employed for tracking, the resonant foil members were approximately two inches in length, one-fourth of an inch in width and were spaced approximately three inches apart along the streamer. Under actual tests a plurality of streamers fifty to one hundred feet long have been satisfactorily employed.

In some applications it may be desirable to construct the streamers as shown in Figure 4. A curtain 15 comprises two layers of paper or other dielectric material having resonant foil members glued or otherwise fastened therebetween. The curtain 15 is ribboned along its length, thus forming a narrow paper streamer along which the resonant foil members are uniformly spaced. The ribboned portion terminates before each end of the curtain such that the streamers are kept suspended in an orderly fashion below the balloon when in flight and a mosaic of resonant reflecting members is thereby exposed to the tracking radio waves. The curtain 15 may be rolled up and attached to the balloon in a manner similar to that described in connection with the rolled paper steamers. The rolled curtain may be slipped over shaft 9 in place of the rolls 8 in Figure 1, and the free end of the curtain may be affixed to supporting bar 5. Upon ascent of the assembly the curtain will unfurl and shaft 9 with its vanes 10 will be released. The resonant foil members spaced on the curtain will then provide an effective signal target. In one embodiment curtains from ten to twenty feet in length were employed satisfactorily.

Having described the present invention it is understood that the specific examples are cited by way of illustration rather than by way of limitation. For example, both the individual streamers and the curtain have been described as having two layers of dielectric material. If desired, the resonant foil members may be directly affixed to a single layer of dielectric backing. Though the resonant foil members have been described as being carried aloft by balloons, the streamers may be broadcast directly to the atmosphere from airplanes, or may be suspended below parachutes to provide aerial signal reflecting targets. Many other modifications within the scope of the invention as set forth in the appended claims may occur to persons skilled in the art.

What is claimed is:

1. A reflecting signal target comprising, aerial supporting means, a streamer of dielectric material suspended from said supporting means, and metal foil strips of predetermined dimensions attached longitudinally to said streamer and uniformly spaced therealong.

2. An aerial target for reflecting radio waves comprising, an aerial vehicle, streamers of dielectric material having affixed thereto a plurality of resonant metal foil strips said streamers being rolled and fastened at their free ends to said vehicle, and automatic means whereby said streamers may be unrolled upon ascent of said vehicle.

3. A reflecting radio signal target comprising, an aerial vehicle, streamers of dielectric material rolled and attached at one end to said vehicle, a plurality of foil strips of predetermined dimensions affixed to and spaced along said streamers, and automatic means for permitting the gradual unrolling of said streamers upon ascent of said vehicle.

JACOB GEORGE SPERLING.

REFERENCES CITED

The following references are of record in the file of this patent:

UNITED STATES PATENTS

| Number | Name | Date |
|---|---|---|
| 1,096,822 | Brandt | May 19, 1914 |
| 1,320,980 | Bowman | Nov. 4, 1919 |
| 1,334,947 | Davis | Mar. 30, 1920 |
| 1,794,828 | Bleriot | Mar. 3, 1931 |
| 1,892,755 | Scheppmann | Jan. 3, 1933 |
| 2,151,336 | Scharlau | Mar. 21, 1939 |
| 2,366,423 | Pear, Jr. | Jan. 2, 1945 |
| 2,382,065 | Kappeler | Aug. 14, 1945 |

FOREIGN PATENTS

| Number | Country | Date |
|---|---|---|
| 295,613 | Great Britain | Aug. 14, 1928 |
| 541,611 | Germany | June 8, 1927 |
| 759,788 | France | Feb. 9, 1934 |

OTHER REFERENCES

London Daily Express, Thursday, Feb. 24, 1944, page 1, column 1–343–18.